Jan. 26, 1965   W. P. MOORE, JR., ETAL   3,167,588
CATALYTIC HYDROGENATION OF NITROSODIALKYLAMINES
TO PRODUCE UNSYMMETRICAL DIALKYLHYDRAZINES
Filed Dec. 1, 1959

INVENTORS
WILLIAM P. MOORE Jr.
WILLIAM C. SIERICHS
BY
Benjamin Sweedler
ATTORNEY 3,167,588
CATALYTIC HYDROGENATION OF NITROSODI-
ALKYLAMINES TO PRODUCE UNSYMMETRI-
CAL DIALKYLHYDRAZINES
William P. Moore, Jr., Chester, and William C. Sierichs,
 Hopewell, Va., assignors to Allied Chemical Corpora-
 tion, New York, N.Y., a corporation of New York
Filed Dec. 1, 1959, Ser. No. 856,592
8 Claims. (Cl. 260—583)

This invention relates to the production of unsymmetrical-dialkylhydrazines in which the alkyl groups each contain from 1 to 3 carbon atoms and specifically to the production of unsymmetrical-dimethylhydrazine, herein referred to for the sake of brevity as DMH. More particularly this invention relates to the catalytic hydrogenation of nitrosodimethylamine to produce DMH. While the invention will be hereinafter described, for the most part, in connection with the production of the preferred embodiment DMH, it will be understood it is not limited thereto and includes the preparation of unsymmetrical-dialkylhydrazines such as diethyl-, dipropyl-, unsymmetrical-methylethyl-, and unsymmetrical-ethylpropyl-hydrazines.

In this specification all percentages are on a weight basis.

DMH is used as a special fuel in the guided missile and rocket fields. The reduction of nitrosodimethylamine with hydrogen to produce DMH by reacting the nitrosodimethylamine in the liquid phase in the presence of supported platinum or palladium catalyst under high pressures has been suggested. The platinum or palladium catalysts being expensive must, of course, be recovered to render such procedures economically attractive. In effecting such recovery, it is important to avoid deactivating the catalyst or reducing its efficiency unduly. It is equally important to effect recovery of the catalyst without detrimental effect on the yield of DMH.

It is a principal object of the present invention to provide a catalytic process of hydrogenating nitrosodialkylamines having from 1 to 3 carbon atoms in the alkyl groups, particularly nitrosodimethylamine, employing supported platinum or palladium catalysts in which the supported catalyst particles are recovered readily and in a highly active form.

It is another object of this invention to provide such process in which the recovery of the catalyst in an active form is accomplished without sacrifice to the yield of the unsymmetrical-dialkylhydrazine.

It is still another object of the present invention to provide such process in which the catalyst is recovered in a form relatively free of adsorbed by-products that inhibit reaction and can be returned to the catalyst reactor for reuse without requiring further treatment.

Other objects and advantages of this invention will be apparent from the following detailed description thereof.

In accordance with the present invention the nitrosodialkylamine, particularly nitrosodimethylamine, in the liquid phase is mixed with supported platinum or palladium catalyst particles forming a slurry which, along with hydrogen, is passed through the catalyst reactor under a pressure of from 10 to 1000 p.s.i.g. and at a temperature of from 25° to 125° C. The reaction mixture thus produced containing the catalyst and unreacted reactants is introduced into a flasher maintained at a temperature of 70° to 120° C. in which the pressure is from 20 to 1000 mm. of mercury absolute. The bulk of the reaction products and by-products in the reactor effluent is rapidly flashed and thus separated from the catalyst. The residence or retention time in the flasher is a maximum of 1 minute, and preferably is from 1 to 10 seconds.

This invention is particularly effective in separating platinum or palladium supported catalysts in active form from the reactor effluent employing supports for the catalyst having relatively high specific surface areas such, for example, as charcoal, other forms of carbon having relatively high specific surface areas, titania, and alumina, particularly activated alumina and gamma alumina containing large internal pore structures. By high specific surface area is meant having a specific surface area greater than 10 square meters per gram as determined by the adsorption isotherm method of Brunauer, Emmett and Teller; J. Amer. Chem. Soc. 60, 309 (1938).

Surprisingly the bulk of the DMH and by-product dimethylamine and methylene dimethylhydrazine are flashed off the catalyst with no detectable decomposition of the DMH or by-products or loss in catalyst efficiency or activity, in the process of this invention in which, as noted, the reactor effluent containing catalyst particles is flashed in a flasher with low retention time, less than 1 minute and preferably 1 to 10 seconds.

Methylene dimethylhydrazine is formed in small amounts in the hydrogenation of dimethylnitrosamine regardless of reaction conditions and the purity of the feed. It tends to polymerize and deactivate the catalyst. Dimethylamine, the prime by-product, also tends to decrease the catalyst activity although to a lesser extent than is caused by methylene dimethylhydrazine.

Surprisingly, when the reactor effluent is flashed after each pass through the reactor, a concentrated catalyst slurry results which can be recycled and the catalyst thus reused for long periods of time with little or no reduction in activity or efficiency. The catalyst, for the most part, is recovered in its most active form, namely, finely divided particles some of which are colloidal. The formation of catalyst fines after extended periods of operation causes no operating difficulties, but on the contrary actually increases the activity of the catalyst. Relatively small amounts of catalyst produce large amounts of DMH.

The nitrosodimethylamine subjected to hydrogenation preferably is in the form of an aqueous solution containing from 10% to 70% nitrosodimethylamine and the rest water. In lieu of water other solvents such as dioxane, ethanol, tetrahydrofuran and mixtures of these solvents with or without addition of water may be used. The nitrosodimethylamine in the liquid phase, preferably in the form of a solution, is mixed with the platinum or palladium catalysts to produce a slurry having a concentration of from 0.5% to 5%, preferably from 1% to 3% of catalyst, which slurry is passed through the catalyst reactor or reactors. The weight of the catalyst includes the weight of the support.

As supports for the catalyst, carbon, preferably charcoal, alumina (gamma or activated) and titania may be used in finely divided form, i.e., substantially all will pass through a 100 mesh screen. The supports contain from 0.5% to 15%, preferably from 2% to 6%, by weight of catalyst metal. Such catalysts can be produced in any well known manner, for example, by depositing a platinum salt, e.g., platinic chloride, on the supported particles, treating with sodium hydroxide and reducing the platinum oxide to form a platinum deposit on the support. Alternatively, platinum or palladium may be directly deposited on the supported particles.

After passage of the slurry and hydrogen through the catalyst reactor under a pressure of from 10 to 1000 p.s.i.g. and at a temperature of 25° to 125° C. at a rate to provide a residence time of from 0.5 to 10.0 hours, the reaction mixture containing the supported catalyst particles is passed through a pressure reducing valve into a flash evaporator at a pressure of from 20 to 1000 mm. of mercury absolute and at a temperature of from 70° to 120° C. The bulk of the DMH and by-products are flashed off. There is produced a concentrated slurry containing from 5% to 50% of catalyst, from 0% to 15% DMH, from 0% to 0.3% methylene dimethylhydrazine, from 0% to 10% dimethylnitrosamine, and the rest water, in which the catalyst particles are finely divided, some may be of colloidal size, and are substantially completely free of adsorbed methylene dimethylhydrazine and other by-products. This slurry without exposure to air or other foreign elements is recycled for admixture with the incoming nitrosodimethylamine to form the slurry fed to the catalyst reactor.

In the accompanying drawing, the single figure shows, for purposes of exemplification and to facilitate a better understanding of this invention, a preferred arrangement of the equipment for carrying out the process of this invention.

In this drawing, 10 indicates the feed tank for the solution of dimethylnitrosamine which is fed through line 11 to the reactor feed tank 12 equipped with a suitable agitator to form the slurry. In feed tank 12 the solution of dimethylnitrosamine is mixed with the recycled catalyst stream introduced thereinto through line 13 from the flash evaporator 14 which may be any well known type of flash evaporator in which the material passes through quickly, such, for example, as the falling film, Turba-Film, Rota-Vac or similar quick flash evaporator. Evaporators in which the material passes through quickly while being turbulently agitated, such, for example, as the Turba-Film or Rota-Vac, are especially advantageous.

The reactor feed slurry thus produced in tank 12 is fed through line 15 to the feed pump 16 which pumps the slurry under the desired pressure through line 17 into the bottom of the hydrogenation reactor 18. The number of reactors employed will depend on their capacity and design; the reactor or reactors should provide a retention time for the reaction mixture of from 0.5 to 10.0 hours. Three reactors of the turbine-type in series, in which the slurry is maintained in a state of agitation, as it passes therethrough, and which provide for a retention time of about 2 hours, have been found particularly effective. Hydrogen is introduced into the reactor 18 through a line 19 communicating with a pressure regulator 20 supplied with hydrogen by a hydrogen compressor 21 to which hydrogen is fed by supply line 22.

The reactor effluent is discharged from reactor 18 through line 23 into a gas liquid separator 24 operating under the reaction pressure. Unreacted hydrogen is removed through line 25 and may be recycled through line 26 by the pump or blower 26a to the reactor 18 or may be vented through line 27 if desired. The liquid product slurry is withdrawn through line 28, passes through the relief or letdown valve 29 through line 30 to the evaporator feed tank 31. Reaction product slurry is continuously fed from feed tank 31 through line 32 into the flash evaporator 14 where 90% to 98% of the reaction products and by-products are rapidly flashed off the catalyst; these reaction products and by-products are discharged through line 33 to the DMH purification system. The concentrated catalyst slurry thus produced is withdrawn from the base of the flash evaporator 14 through line 13 and introduced into the reactor feed tank 12 for reuse.

From the feed tank 31 hydrogen separated from the reaction product slurry introduced thereinto flows through line 34 into a pressure regulator 35 which controls the pressure in the evaporator feed tank 31; the pressure in this feed tank and in the flash evaporator 14 is maintained within the range of from 20 to 1000 mm. of mercury absolute. From the pressure regulator 35 the hydrogen may be vented through line 36 or passed from this line 36 into line 37 leading to the hydrogen source 22 communicating with the hydrogen compressor 21.

The amount of hydrogen introduced into the reactor 18 is in excess of the stoichiometric amount required for the reaction. The amount of excess is not critical.

The following examples are given for purposes of illustrating the invention. It will be understood the invention is not limited to these examples.

In these examples, the stream weights are based on 100 pounds of liquid feed to the reactor. All temperatures given are in degrees C.

EXAMPLE I

This example involved a charcoal carrier (all passing through a 200 mesh screen) containing 5% palladium.

92 pounds of aqueous dimethylnitrosamine solution containing 23.9% dimethylnitrosamine, 76.1% water and a trace of methylene dimethylhydrazine were mixed in the reactor feed tank 12 with 8 pounds of the recycled catalyst slurry from the flash evaporator 14 to produce 100 pounds reactor feed of the following composition:

| Components: | Weight, percent |
|---|---|
| Dimethylnitrosamine | 22.19 |
| Dimethylhydrazine | 1.01 |
| Methylene dimethylhydrazine | 0.02 |
| Catalyst | 1.06 |
| Water (by difference) | 75.72 |

The reactor feed was pumped to the bottom of the first of three turbine-type reactors operating in series. 4.21 pounds of hydrogen entered the first reactor directly under the turbine at 150 p.s.i.g. pressure. The liquid and gas flowed upwardly concurrently through the three reactors operating at 52° to 58° with a total retention time of 2 hours. The gas-liquid mixture was discharged from the last reactor of the series to the gas-liquid separator 24. 3 pounds of unreacted hydrogen was recycled back to the hydrogen feed and 101.21 pounds of reactor product was continuously withdrawn. The reactor product had the following composition:

| Components: | Weight, percent |
|---|---|
| Dimethylnitrosamine | 0.43 |
| Dimethylhydrazine | 16.08 |
| Methylene dimethylhydrazine | 0.40 |
| Dimethylamine | 1.28 |
| Ammonia | 0.48 |
| Catalyst | 1.05 |
| Water (by difference) | 80.27 |

This liquid slurry product was fed to a steam heated Turbafilm catalyst flash evaporator 14 operated at atmospheric pressure with an overhead temperature of 97°, a bottoms temperature of 107° and a retention time of 3 seconds. The catalyst slurry, weighing 8 pounds, was continuously withdrawn from the bottoms of the flash evaporator 14 and introduced into the reactor feed tank 12 for reuse. The 8 pounds of catalyst slurry drawn from the flash evaporator 14 had the following composition:

| Components: | Weight, percent |
|---|---|
| Dimethylnitrosamine | 2.75 |
| Dimethylhydrazine | 12.63 |
| Methylene dimethylhydrazine | 0.25 |
| Catalyst | 13.25 |
| Water (by difference) | 71.12 |

The aqueous crude dimethylhydrazine synthesis product continuously recovered as distillate from the flash evaporator 14 weighed 93.21 pounds and had the following composition:

| Components: | Weight, percent |
|---|---|
| Dimethylnitrosamine | 0.24 |
| Dimethylhydrazine | 16.37 |
| Methylene dimethylhydrazine | 0.42 |
| Dimethylamine | 1.39 |
| Ammonia | 0.53 |
| Water (by difference) | 81.05 |

The overall process yield of DMH was 85.5 mol percent with the attack on dimethylnitrosamine 99.0% complete. The reaction efficiency was 86.5%. The yield of dimethylhydrazine was 8 grams per gram of catalyst per hour.

After 400 hours of operation (200 recycles of the catalyst) the catalyst showed no decline in activity.

Polymer-forming methylene dimethylhydrazine was produced in amount of 3.7% but the continuous quick flash method of catalyst recovery prevented build up of polymer on the catalyst. The yield of dimethylamine was 9.7% but the dimethylamine produced was completely removed from the catalyst and caused no reduction in catalyst activity.

It will be noted that the above example involves a charcoal support. Charcoal was deliberately chosen for the purpose of this example because it has the largest internal surface area of all catalyst carriers and is also most susceptible to poisoning. Since in the above example the palladium on charcoal catalyst showed no decline in activity after 400 hours of operation, the example markedly demonstrates the efficiency of the process. Employing platinum or palladium catalysts on other carriers such as titania or activated alumina, which is less susceptible to poisoning than charcoal, even longer life of the catalyst, with no reduction in efficiency, results.

For purposes of comparison a run was made under the conditions described above in connection with the example except that instead of recovering the catalyst by the flash evaporative procedure hereinabove described, the reaction product slurry leaving the last of the three catalyst reactors in series was carefully filtered in the absence of air and other foreign materials and the catalyst thus separated reused. The following table shows that following this filtration procedure, the catalyst is quickly deactivated:

Table

| Number of Catalyst Cycles | 1 | 3 | 6 | 8 |
|---|---|---|---|---|
| Reaction rate constant—$k_1$ (Minute$^{-1}$) | .026 | .018 | .009 | .004 |

By reaction rate constant is meant the rate at which the logarithm of dimethylnitrosamine concentration (mols/100 grams) in the reaction mixture declines with reaction time (minutes).

No decline in the activity of the catalyst or in the reaction rate constant took place after 200 cycles in Example I.

EXAMPLE II

The synthesis of dimethylhydrazine by the hydrogenation of dimethylnitrosamine was carried out as in Example I except that a titania carrier (all passing through a 100 mesh screen) containing 4.5% palladium was used and the synthesis pressure was 800 p.s.i.g. The reactor was continuously fed at 800 p.s.i.g. pressure with hydrogen and a solution of the following composition produced by mixing the aqueous dimethylnitrosamine solution with the recycled catalyst slurry from the flash evaporator:

| Components: | Weight percent |
|---|---|
| Dimethylnitrosamine | 23.0 |
| Dimethylhydrazine | 1.1 |
| Methylene dimethylhydrazine | 0.01 |
| Catalyst | 3.0 |
| Water (by difference) | 72.89 |

The gas-liquid mixture was discharged from the synthesis reactor after a total retention time of 4.55 hours at 58° C. to the liquid-gas separator where the excess hydrogen was separated. Reactor product of the following composition was continuously withdrawn:

| Components: | Weight percent |
|---|---|
| Dimethylnitrosamine | 0.9 |
| Dimethylhydrazine | 17.8 |
| Methylene dimethylhydrazine | 0.1 |
| Dimethylamine | 1.2 |
| Ammonia | 0.4 |
| Catalyst | 2.9 |
| Water (by difference) | 76.7 |

This liquid product was fed to a flash evaporator operated at 200 mm. mercury absolute pressure with an overhead temperature of 64° C. and a bottoms temperature of 70° C. Heating time in the flash evaporator was less than one minute. The dimethylhydrazine and by-products were flashed overhead. The catalyst slurry was continuously pumped from the bottom of the flash evaporator and recycled to the reactor feed for reuse. The reaction of dimethylnitrosamine was 96% complete with a conversion efficiency to dimethylhydrazine of 92%. Process yield was 88.3%. In repeated cycles the catalyst showed no decline in activity.

EXAMPLE III

The synthesis of dimethylhydrazine by the hydrogenation of dimethylnitrosamine was carried out in the manner of Example I except that a charcoal carrier (all passing through a 100 mesh screen) containing 2.5% platinum was used. The catalyst slurry from the flashing operation was mixed with fresh aqueous dimethylnitrosamine to give the following mixture which was fed to the dimethylhydrazine synthesis reactor with hydrogen at 150 p.s.i.g. pressure. The reactor was operated at 52° C.

| Components: | Weight percent |
|---|---|
| Dimethylnitrosamine | 23.0 |
| Dimethylhydrazine | 0.1 |
| Methylene dimethylhydrazine | Trace |
| Catalyst | 0.9 |
| Water (by difference) | 76.0 |

The gas-liquid mixture was continuously discharged from the reactor after a retention time of 2.0 hours. The excess hydrogen was separated in the gas-liquid separator. Reactor product of the following composition was continuously withdrawn:

| Components: | Weight percent |
|---|---|
| Dimethylnitrosamine | 5.3 |
| Dimethylhydrazine | 13.2 |
| Methylene dimethylhydrazine | 0.7 |
| Dimethylamine | 0.3 |
| Ammonia | 0.1 |
| Catalyst | 0.9 |
| Water | 79.5 |

This liquid product was sent continuously to a flash evaporator operating at atmospheric pressure with an overhead temperature of 97° C. and a bottoms temperature of 107° C. The dimethylhydrazine and by-products were flashed overhead. The catalyst slurry was continuously removed from the bottom of the evaporator and recycled to the reactor feed for reuse. Evaporation time in the flash evaporator was less than 10 seconds. The reaction of the dimethylnitrosamine was 76.7% complete with a conversion efficiency to dimethylhydrazine of 93.2%. In repeated cycles the catalyst showed no decline in activity.

It will be noted that the present invention provides a catalytic process of hydrogenating nitrosodialkylamines having from 1 to 3 carbon atoms in the alkyl group, particularly nitrosodimethylamine, employing supported platinum or palladium catalysts in which the supported catalyst particles are recovered readily and in a highly active form relatively free of adsorbed by-products which tend to inactivate the catalyst. The catalyst is recovered in a form permitting its ready reuse without further treatment. The concentrated catalyst slurry thus recovered after each pass through the catalyst reactor is fed from the flash evaporator to the reactor feed tank without exposure to air or other foreign elements, thus minimizing possible poisoning of the catalyst.

We have found that the concentration limits of the primary reaction inhibitors, namely methylene dimethylhydrazine, dimethylamine and ammonia are 0.05%, 0.5% and 0.5%, respectively, on the basis of the total reactor feed mixture. The process of this invention gives a reactor feed mixture which invariably contains about 0.02% or less of methylene dimethylhydrazine and practically no dimethylamine or ammonia, thus minimizing inactivation of the catalyst.

It will be further noted this recovery of the catalyst in an active form is accomplished without sacrifice to the yield of the unsymmetrical-dialkylhydrazine. With this invention, a productivity of 8 grams of DMH per gram of catalyst per hour is easily obtained. In fixed bed catalyst operations, on the other hand, the maximum productivity obtainable thus far, to the best of our knowledge, is of the order of 0.07 gram DMH per gram of catalyst per hour. To obtain such productivity with fixed bed catalyst, it is necessary to operate under pressures of from 1500 to 2000 p.s.i.g. The present invention, on the other hand, gives productivity of the order of 8 grams DMH per gram of catalyst per hour, even at pressures as low as 50 p.s.i.g.

The hydrogenation may be carried out in stainless steel reactors. The DMH may be stored in aluminum, mild steel or glass containers. It will, of course, be appreciated that any desired materials of construction resistant to corrosion by the reactants and reaction products may be employed.

It is to be understood that this invention is not to be restricted to the present disclosure otherwise than as defined by the appended claims.

What is claimed is:

1. The process of hydrogenating nitrosodialkylamines to produce unsymmetrical-dialkylhydrazines in which the alkyl groups each contain from 1 to 3 carbon atoms, which process comprises feeding a slurry of the nitrosodialkylamine, supported particles of catalyst from the group consisting of platinum and palladium supported on a carrier from the group consisting of carbon, titania and alumina having a specific surface area greater than 10 square meters per gram, and hydrogen through a reaction zone maintained at a temperature of 25° to 125° C. and under a pressure of from 10 to 1000 p.s.i.g., introducing the resultant reaction mixture containing the catalyst particles into an evaporating zone maintained at a pressure of from 20 to 1000 mm. of mercury absolute and at a temperature of from 70° to 120° C. to flash evaporate and thus remove quickly the reaction products and by-products from the catalyst particles, and utilizing the supported catalyst particles thus separated to catalyze the hydrogenation of additional nitrosodialkylamine.

2. The process of hydrogenating nitrosodialkylamines to produce unsymmetrical-dialkylhydrazines in which the alkyl groups each contain from 1 to 3 carbon atoms, which process comprises feeding a slurry of the nitrosodialkylamine, supported particles of catalyst from the group consisting of platinum and palladium supported on a carrier from the group consisting of carbon, titania and alumina having a specific surface area greater than 10 square meters per gram, said supported particles of catalyst containing from 0.5% to 15% by weight of catalyst metal and said slurry containing from 0.5% to 5% by weight of supported particles of catalyst, and hydrogen through a reaction zone maintained at a temperature of 25° to 125° C. and under a pressure of from 10 to 1000 p.s.i.g., introducing the resultant reaction mixture containing the catalyst particles into an evaporating zone maintained at a presure of from 20 to 1000 mm. of mercury absolute and at a temperature of from 70° to 120° C. to flash evaporate and thus remove quickly the reaction products and byproducts from the catalyst particles, and produce a concentrated slurry containing from 5% to 50% catalyst, mixing said slurry with additional nitrosodialkylamine in the liquid phase and feeding the resultant slurry through said reaction zone.

3. The process as defined in claim 2, in which the retention time of the slurry in the flash evaporation is less than 1 minute.

4. The process as defined in claim 2, in which the retention time of the slurry in the flash evaporation is from 1 to 10 seconds.

5. The continuous process of hydrogenating nitrosodimethylamine to produce unsymmetrical-dimethylhydrazine which comprises continuously feeding a slurry of nitrosodimethylamine, and particles of catalyst from the group consisting of platinum and palladium supported on a carrier from the group consisting of carbon, titania and alumina having a specific surface area greater than 10 square meters per gram, said supported particles of catalyst containing from 0.5% to 15% by weight of catalyst metal and said slurry containing from 0.5% to 5% by weight of supported particles of catalyst, and hydrogen through a reaction zone maintained under a pressure of 10 to 1000 p.s.i.g., and at a temperature of 25° to 125° C., continuously removing the reaction mixture from said reaction zone, continuously reducing the pressure on said reaction mixture containing the catalyst to a pressure of from 20 to 1000 mm. of mercury absolute and heating said mixture under said reduced pressure to a temperature of from 70° to 120° C. to flash off from the catalyst dimethylhydrazine and by-products and continuously removing the catalyst from which dimethylhydrazine and by-products have been flashed off and utilizing said catalyst to catalyze the hydrogenation of additional nitrosodimethylamine.

6. The continuous process of hydrogenating nitrosodimethylamine to produce unsymmetrical-dimethylhydrazine which comprises the following steps: step 1, continuously feeding a slurry of nitrosodimethylamine, and particles of catalyst from the group consisting of platinum and palladium on a carrier from the group consisting of carbon, titania and alumina having a specific surface area greater than 10 square meters per gram, said supported particles of catalyst containing from 0.5% to 15% by weight of catalyst metal and said slurry containing from 0.5% to 5% by weight of supported particles of catalyst, and hydrogen through a reaction zone maintained under a pressure of 10 to 1000 p.s.i.g. at a temperature of 25° to 125° C.; step 2, continuously removing the reaction mixture from said reaction zone, reducing the pressure thereon to a pressure of from 20 to 1000 millimeters of mercury absolute and flowing it into a flash evaporation zone heated to a temperature of 70° to 120° C. to flash off dimethylhydrazine and by-products from the catalyst; and step 3, continuously removing the catalyst from step 2 and employing said catalyst in step 1 to supply the catalyst for reaction.

7. The continuous process of hydrogenating nitrosodimethylamine to produce unsymmetrical-dimethylhydrazine which comprises the following steps: step 1, continuously feeding a slurry of nitrosodimethylamine and particles of catalyst from the group consisting of platinum and palladium on a carrier from the group consisting of carbon, titania and alumina having a specific surface area greater than 10 square meters per gram, said slurry containing from 0.5% to 5% by weight of said catalyst particles and said particles of catalyst containing from 0.5% to 15% by weight of catalyst metal, and hydrogen through a reaction zone maintained under a pressure of 10 to 1000 p.s.i.g. at a temperature of 25° to 125° C.; step 2, continuously removing the reaction mixture from said reaction zone, continuously reducing the pressure thereon to a pressure of from 20 to 1000 millimeters of mercury absolute while heating for less than one minute to a temperature of 70° to 120° C. and agitating the mixture to flash evaporate dimethylhydrazine and by-products and thus separating same from the catalyst particles; and step 3, continuously removing the unvaporized residue from step 2 and using it in step 1 to supply catalyst which is admixed with nitrosodimethylamine to form the slurry passed through step 1.

8. The process as defined in claim 7, in which the retention time in step 2 is from 1 to 10 seconds.

References Cited in the file of this patent

UNITED STATES PATENTS

| | | |
|---|---|---|
| 2,979,505 | Tuemmler | Apr. 11, 1961 |

FOREIGN PATENTS

| | | |
|---|---|---|
| 797,483 | Great Britain | July 2, 1958 |
| 801,534 | Great Britain | Sept. 17, 1958 |
| 577,535 | Canada | June 9, 1959 |
| 1,166,226 | France | June 16, 1958 |
| 1,160,629 | France | Mar. 3, 1958 |

OTHER REFERENCES

Berkman et al.: "Catalysis," pages 370 and 372 (1940).